L. H. DAVIS.
Corn Sheller.
No. 10,002.
Patented Sept. 6, 1853.
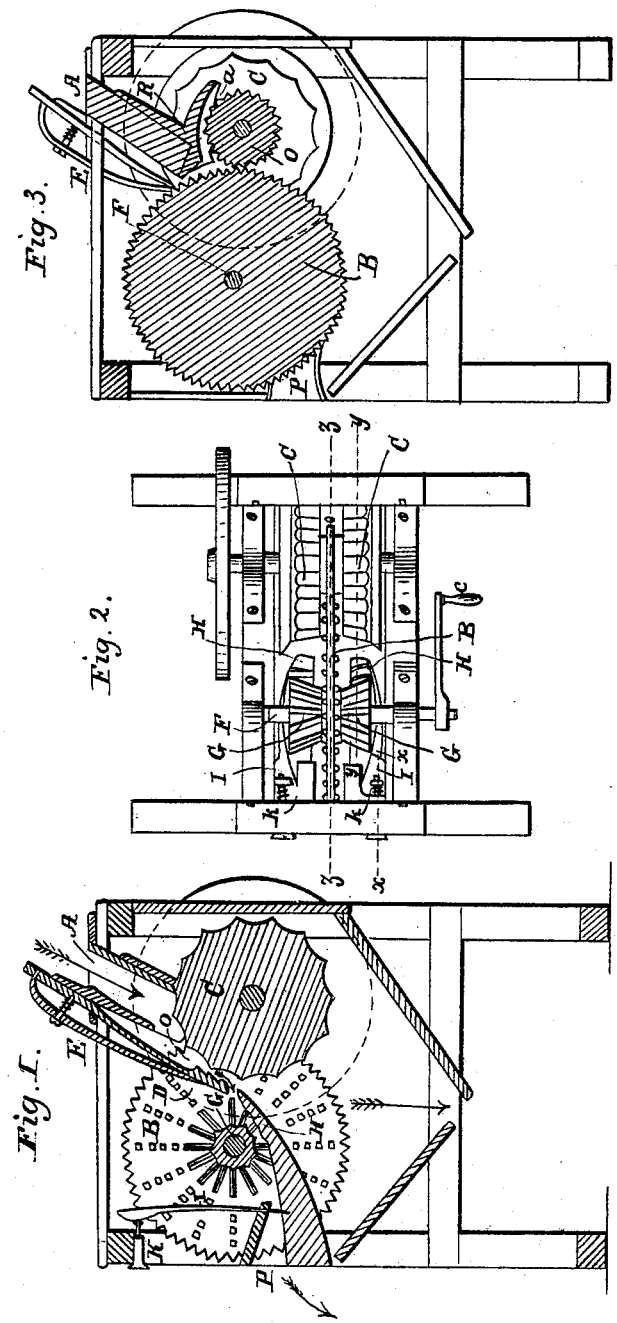

ized as described above will effectually prevent it.

UNITED STATES PATENT OFFICE.

LEVIS H. DAVIS, OF KENNETT SQUARE, PENNSYLVANIA.

CORN-SHELLER.

Specification of Letters Patent No. 10,002, dated September 6, 1853.

*To all whom it may concern:*

Be it known that I, LEVIS H. DAVIS, of Kennett Square, in the county of Chester and State of Pennsylvania, have invented a new and useful Improvement in Corn-Shellers; and I do hereby declare that the following is a full, clear, and exact description of the construction and operation of the same, reference being had to the annexed drawings, forming part of this specification, in which—

Figure 1 is a vertical section upon the lines $x\ x$ and $y\ y$ of Fig. 2, taken with the machine complete and in working order. Fig. 2 is a plan of the machine with the cover, arm D and mouth A removed. Fig. 3 is a vertical section of the complete machine upon the line $z\ z$ of Fig. 2.

Similar letters in the several figures designate the same part of the machine.

The object of my invention is to construct a corn sheller in which the ear shall be entirely stripped of its grain and the cob issue clean from the machine instead of falling from it with numerous kernels adhering to its extremities, as is usually the case; and also to protect the cogged gearing so that it shall not be deranged by grains of corn working in between the teeth.

The invention consists in placing below the usual shelling apparatus another shelling wheel upon the shaft of the picker wheel having in front a toothed arm attached by a spring to the frame of the machine, so that when the cob is issuing from the upper shelling arrangement its extremity is caught in the lower sheller, which removes the kernels remaining upon it, and at the same time prevents the ear from falling suddenly and imperfectly stripped from the upper sheller; also in adding to the covering of the cog wheel and pinion operating the machine flanges on each side, so as to thoroughly prevent the admission of grain to the gearing.

In the drawing A is the mouth of the sheller, B the ordinary picker wheel, C the shelling wheel having before it the toothed arm D, regulated by the spring E, so as to admit ears of different sizes between it and the wheel. This is the ordinary corn sheller. Upon the shaft F I place the wheel G, fluted, beveled or of any form of perimeter adapted to the purpose, and before and under it the toothed arm H, attached to the spring I, regulated by the screw K.

R is the ordinary covering of the teeth of the wheel B and leaves of the pinion O. To the sides of this covering I add the flanges $a$, so as to completely inclose the teeth and leaves.

The operation of my sheller is as follows:—The machine, as is seen in Fig. 2, is double. The operation of one side will, however, explain the whole process. Motion is communicated to the machine by any suitable power applied to the crank $c$. The ear is thrown in at A and passes between the face of the picker wheel B, the wheel C, and the toothed arm D, as shown by the arrows, obtaining a rotary motion in its course, which by rubbing it against the various projections on the wheels and arms strips it of the grain as it moves forward. When the ear has advanced sufficiently far, its point enters between the teeth of the arm H and the perimeter of the wheel G, which remove the kernels remaining on the extremity of the ear and cause its descent to be sufficiently retarded for the upper sheller to remove all the grains from the butt of the cob, which perfectly cleaned passes out at P, the corn falling through the bottom of the machine. The spring I permits cobs of various sizes to pass between the arm H and wheel G.

The flanges $a$ of the covering R protect the teeth of the wheel B and leaves of the pinion O in the most effectual manner from the entrance of grains of corn between them, thus preventing derangement in the gearing.

The great advantage of this machine is, that the cobs issue from it completely stripped of their grain instead of having numerous kernels adhering to their extremities, as is usually the case, for the reason that in ordinary shellers the point of the ear passes before the operation properly commences and the cob drops suddenly from between the shelling arrangement by the impetus of its rotation before its butt is properly cleaned. Both of these defects are obviated by my improvement, which catches the point of the ear and removes the untouched kernels, and also retains the ear between the upper shellers sufficiently long for them to operate upon the butt and free it from the adhering grains.

The necessity for protecting the gearing from the admission of kernels will be readily admitted, and that my arrangement effectually serves that end must be conceded without demonstration.

What I claim as my invention and desire to secure by Letters Patent, is—

1. The introduction of the wheels G, and arms H attached to the springs I and regulated by the screws K, as described, for the purpose of stripping the ear of its kernels in the manner specified.

2. I also claim the flanges $a$ upon the gear covering R, for protecting the gearing from the admission of shelled corn, as herein fully set forth.

In testimony whereof I have hereunto signed my name before two subscribing witnesses.

LEVIS H. DAVIS.

Witnesses:
GEO. PATTEN,
JNO. OBER.